(12) United States Patent
Callicrate

(10) Patent No.: US 9,259,009 B2
(45) Date of Patent: Feb. 16, 2016

(54) SYSTEM AND METHOD FOR RESTRAINING AND HANDLING LIVESTOCK

(71) Applicant: Teegan Callicrate, Wheeler, KS (US)

(72) Inventor: Teegan Callicrate, Wheeler, KS (US)

(*) Notice: Subject to any disclaimer, the term of this patent is extended or adjusted under 35 U.S.C. 154(b) by 0 days.

(21) Appl. No.: 14/736,869

(22) Filed: Jun. 11, 2015

(65) Prior Publication Data

US 2015/0359233 A1    Dec. 17, 2015

Related U.S. Application Data

(60) Provisional application No. 62/010,875, filed on Jun. 11, 2014.

(51) Int. Cl.
*A22B 1/00*    (2006.01)
*A01K 1/06*    (2006.01)
*A61D 3/00*    (2006.01)

(52) U.S. Cl.
CPC ............ *A22B 1/00* (2013.01); *A01K 1/0613* (2013.01); *A61D 3/00* (2013.01)

(58) Field of Classification Search
CPC ....... A22C 18/00; A01K 1/00; A01K 1/0017; A01K 1/0029
USPC ........ 452/53, 54, 55, 843; 119/730–734, 752, 119/751, 840–843, 502, 507, 525, 738
See application file for complete search history.

(56) References Cited

U.S. PATENT DOCUMENTS

| | | | | |
|---|---|---|---|---|
| 4,303,258 A * | 12/1981 | Davis | ......................... | B60P 3/04 119/400 |
| 5,129,362 A * | 7/1992 | Ferrell | ..................... | A61D 3/00 119/502 |
| 5,184,572 A * | 2/1993 | Meier | .................. | A01K 1/0613 119/733 |
| 5,331,923 A * | 7/1994 | Mollhagen | ........... | A01K 1/0613 119/729 |
| 6,513,459 B2 * | 2/2003 | Linn | .................... | A01K 1/0613 119/729 |
| 8,910,595 B2 * | 12/2014 | Ulrich | .................. | A01K 1/0613 119/732 |

* cited by examiner

*Primary Examiner* — Richard Prince, Jr.
(74) *Attorney, Agent, or Firm* — Sheridan Ross P.C.

(57) ABSTRACT

A restraining pen for livestock is provided for humane, safe and efficient handling of livestock. A restraining or knocking pen is provided that has features for securely receiving an animal such that the animal may be subject to knocking or veterinary operations and subsequently released from the pen without danger to the animal or human operators. A novel design provides for a compact footprint of the pen and an economical use of space.

19 Claims, 9 Drawing Sheets

SYSTEM AND METHOD FOR RESTRAINING AND HANDLING LIVESTOCK

CROSS-REFERENCE TO RELATED APPLICATION

This application claims the benefit of U.S. Provisional Application No. 62/010,875, filed Jun. 11, 2014, the entirety of which is hereby incorporated by reference.

BACKGROUND OF THE INVENTION

The present invention relates generally to confining and restraining cattle and other animals. More specifically, the present invention contemplates a method and system of restraining animals to facilitate handling of the animal, as may be necessary during slaughter or veterinary operations such as inoculations, castrations and the like.

The effective restraint and handling of livestock during various operations has always presented a problem for farmers, ranchers and veterinarians. An animal must be securely restrained for the protection of the person or persons administering the procedure, hereinafter called the operator. At the same time, the restraining device must be constructed and used in a fashion that does not injure the animal.

Known restraining devices have included simple chutes, clamping head gates, vise-like body clamps, and various combinations of these features. These devices have presented many problems.

Prior efforts to combine the above features into a single system have resulted in cumbersome devices which are not easily transportable, which include a considerable array of control levers and the like, often inconveniently located on several sides of the device, typically occupy a significant amount of valuable space, and which can require multiple operators for their effective use.

SUMMARY OF THE INVENTION

There has been a long-felt and unmet need to provide a restraining device or knocking pen that is useful for a number of different animals that minimizes the amount of space required of the pen, and which is safe and effective for both operators and animals alike. Embodiments of the present invention provide a restraining apparatus for effectively loading, restraining and releasing an animal to facilitate slaughter operations or the like. Such animals include, but are not limited to, cattle, bison, swine, and others.

U.S. Pat. No. 1,547,520 to Pancero et al., which is hereby incorporated by reference in its entirety, discloses a knocking pen with increased capacity for use with various sized animals. Various features of Pancero, including gate features for containment of various sized animals and related ratchet devices are contemplated for use in various embodiments of the present invention.

U.S. Pat. No. 1,646,934 to Schmidt, which is hereby incorporated by reference in its entirety, discloses a knocking pen that contemplates automatic discharge of a knocked animal from the pen. Various features of Schmidt, including gate members for releasing a knocked animal are contemplated for use with various embodiments of the present invention.

U.S. Pat. No. 3,724,027 to Zuber, which is hereby incorporated by reference in its entirety, discloses a knocking pen with automatic head restraint features and a drop-away floor and releasable side panel for releasing an animal from the pen. Various devices and features of Zuber are contemplated for use with knocking pens according to various embodiments of the present invention.

U.S. Pat. No. 3,848,294 to Taylor et al., which is hereby incorporated by reference in its entirety, discloses methods and systems of slaughtering animals. Various features of Taylor, including various means for handling and restraining animals are contemplated for use in various embodiments of the present invention.

U.S. Pat. No. 5,184,572 to Meier, which is hereby incorporated by reference in its entirety, discloses an apparatus for confining and restraining an animal to facilitate veterinary operations. Various features of Meier, including head restraint devices and operation levers are contemplated for use in various embodiments of the present invention.

U.S. Pat. No. 5,331,923 to Mollhagen, which is hereby incorporated by, reference in its entirety, discloses a portable squeeze chute apparatus for animals. Various features of Mollhagen, including exit gates, noise reduction, and weight detection means are contemplated for use with various embodiments of the present invention.

U.S. Pat. No. 7,832,363 to Mollhagen, which is hereby incorporated by reference in its entirety, discloses an adjustable livestock alleyway with pivotable panels. Various features of Mollhagen, including the ability to adjust at least a width of the alleyway are contemplated by various embodiments of the present invention.

One object of the present invention is to provide an improved animal restraining apparatus for effectively confining and restraining an animal during slaughter or veterinary operations or the like. A further object of the present invention is to provide such an apparatus which includes remotely operated entrance and egress features to facilitate entry and unloading of an animal. It is yet a further object of the present invention to provide such an apparatus with a hinged loading ramp to facilitate the animal's entry to the device. It is yet another object of the present invention to provide such an apparatus with devices and features, such as a head gate or similar features to restrain the head and neck of an animal. It is yet another object of the present invention to provide such an apparatus with controls to permit a single operator to load, restrain, perform the operation, and release the animal without risk of injury (in the case where animals are treated and released) to the animal or the operator. It is yet another object of the present invention to provide an apparatus which comprises an economical use of space such that the device and the related operations may be employed in a number of locations and facilities, including those where space is limited. Various embodiments of the present invention contemplate providing a pen that is suitable for receiving and securing various animals, including but not limited to bovine, swine, bison, lamb, elk, deer, antelope, and numerous other animals that may be suitable for slaughter.

In one aspect of the present invention, a portion of a head catch or head restraining device is provided in hinged communication and interconnected with a moveable sidewall. In certain embodiments, a moveable sidewall may be translated after knocking operations are complete such that both the sidewall and a portion of the head catch no longer operate to restrain and/or contain the animal. The animal is thus free to roll out or be ejected from the pen.

Other objects and advantages of this invention will become apparent from the following description taken in conjunction with the accompanying drawings wherein are set forth, by way of illustration and example, certain embodiments of this invention.

In one embodiment, a restraining pen for humane slaughter of livestock animals is provided, the pen comprising a first vertical sidewall and a second vertical sidewall, the first vertical sidewall and second vertical sidewall spaced apart and at least partially defining an interior volume adapted to receive at least one of a plurality of animals. The first vertical sidewall comprises a first hinged restraining member, the first hinged restraining member hinged about a longitudinal axis of the pen and moveable between at least a first position and a second position. The second vertical sidewall comprises a second hinged restraining member, the second hinged restraining member hinged about a longitudinal axis of the pen and moveable between at least a first position and a second position. At least one of the first hinged restraining member and the second hinged restraining member comprises a user interface for moving the hinged restraining member between the first position and the second position, and at least one of the first vertical sidewall and second vertical sidewall is moveable in a vertical direction such that the sidewall and associated hinged restraining member are displaceable in a manner that allow for egress of an animal.

In additional to or in lieu or conventional knocking features and methods, such as may be performed with a bolt gun, embodiments of the present invention also contemplate various stunning techniques and electrocution methods. For example, various features as shown in described in U.S. Pat. No. 5,906,540 to Grandin, which is hereby incorporated by reference in its entirety, are contemplated for use in embodiments of the present invention. Grandin discloses an electronic animal stunning system wherein animals may be continuously stunned, such as by electrode paddles while being moved through a passageway. Such features may be provided in combination with features and devices as shown herein.

The drawings constitute a part of this specification and include exemplary embodiments of the present invention and illustrate various objects and features thereof.

DETAILED DESCRIPTION OF THE INVENTION

As used herein, the term "knocking component" refers to any device, feature, method, or system which may be used to slaughter a livestock animal, such as, by way of non-limiting example, a bolt gun or a stunner. Other examples and types of knocking components will be well-known to those of ordinary skill in the art.

As used herein, the terms "vertical" and "substantially vertical" each describe any feature that forms an angle of between about 60 and about 120 degrees, and preferably about 90 degrees, with a horizontal axis or plane, such as a floor or a ground surface.

Figure 1:
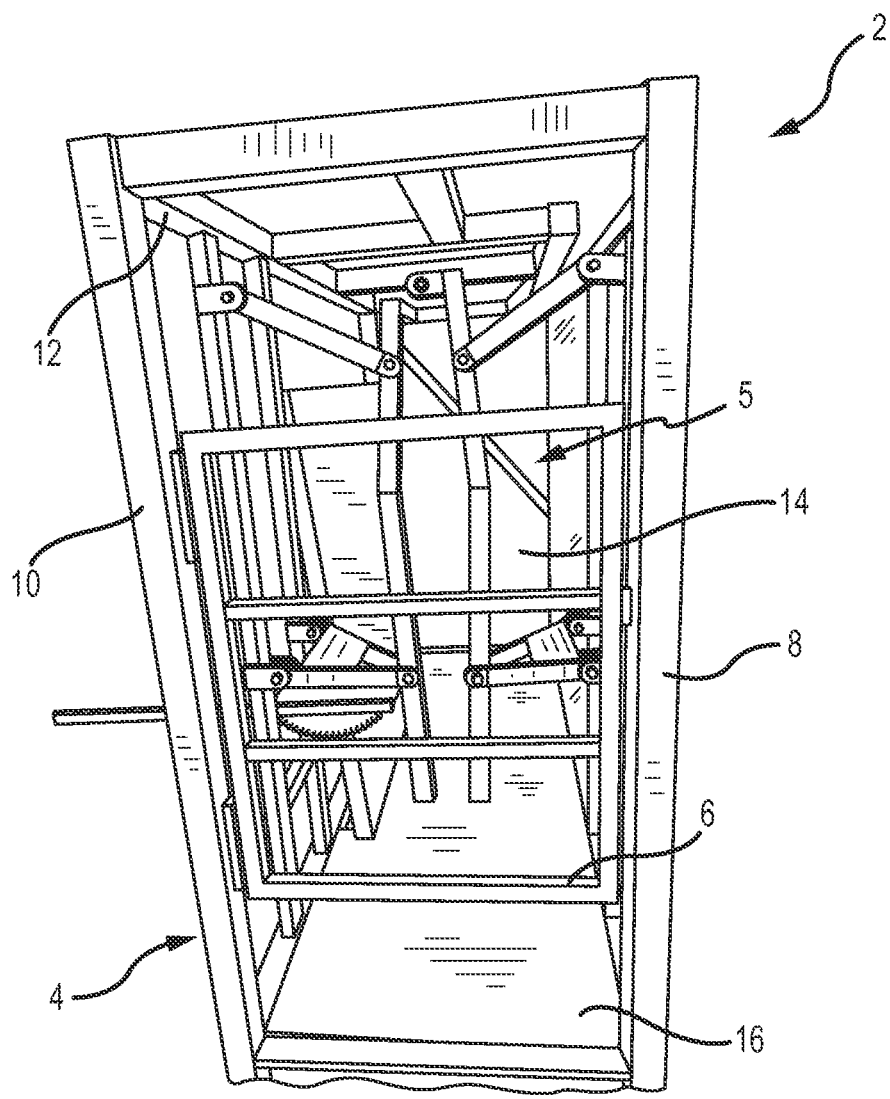
FIG. 1 is a perspective view of a knocking pen according to one embodiment of the present invention.

FIG. 1 depicts one embodiment of a knocking pen 2. The knocking pen 2 comprises a containment feature for receiving and containing an animal such that the animal is restrained in a manner that is suitable for slaughter or veterinary operations while minimizing risk to the animal and human operators. The knocking pen 2 comprises a first end 4, the first end 4 comprising a gate 6 or door member. In the depicted embodiment, the gate 6 is hinged about a frame member 8 of the pen 2. In various embodiments, first end 4 and second end 5 both comprise a gate member 6. The frame member 8 comprises vertical 10 and horizontal 12 support members, the support members provided to contain an animal and provide structural support for various features of the pen 2 as shown and described herein. The gate 6 may be manually or automatically opened and closed to secure an animal within an interior volume 14 of the pen 2. The gate 6, in various embodiments comprises locking members to prevent unwanted egress from an animal from at least the gate portion 6 of the pen 2. A floor member 16 is provided within the interior volume 14. In alternative embodiments, however, the pen 2 does not comprise a floor member or feature but rather utilizes an existing ground or floor surface of the environment in which the pen 2 is disposed. The floor member 16 of FIG. 1 comprises a diamond plate type floor. Alternatively, however, it is contemplated that the floor member 16 comprises a grate type structure to allow for ease of cleaning and pass-through of fluids and materials, as well as reducing the overall weight of the pen 2. In embodiments wherein the floor member 16 is provided as a substantially flat or planar member, it is preferably sloped to one or more sides or ends of the pen 2 to facilitate cleaning and allow fluid to flow toward a single location and generally away from the center of the pen 2.

Figure 2:
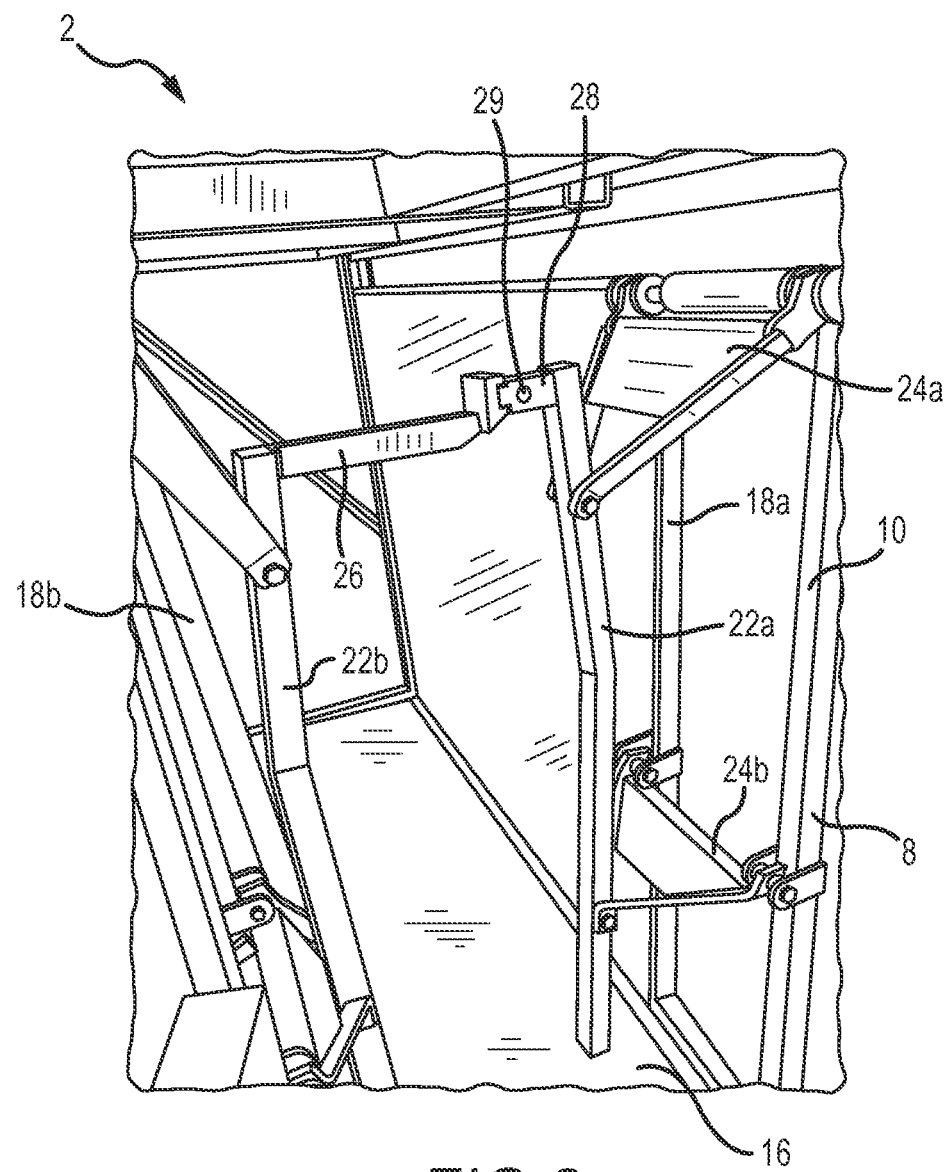
FIG. 2 is a perspective view of a knocking pen according to one embodiment of the present invention.

FIG. 2 is a perspective view showing an interior of a pen 2 according to one embodiment of the present invention. As shown, the pen 2 comprises a pair of sidewalk 18a, 18b for containing an animal. At least one of the sidewalls 18a, 18b is movable as shown and described herein to allow for egress of a knocked animal. In the depicted embodiment, a head restraint 20 is provided proximal a forward end of the frame 8 of the pen 2. The head restraint 20 comprises a pair of hinged members 22a, 22b. In the depicted embodiment, hinged members 22a, 22b comprise substantially vertical members with an angle or bend provided therein. Alternatively, however, it is contemplated that hinged members 22a, 22b may comprise any one or more of a number of geometric shapes, including curved and rectangular members. A first hinged member 22a is provided on and hingedly connected to a first sidewall 18a. A second hinged member 22b is provided on and hingedly connected to a second sidewall 18b. The first hinged member 22a is connected to at least one vertical member 10 of the frame 8 via first and second triangular linkages 24a, 24b. It will be expressly recognized, however, that any hinged connectors are suitable for connecting the first hinged member 22a with the frame 8 and/or first sidewall 18a. In various embodiments, the first hinged member 22a comprises a passive member in that the hinges are not powered or directly-driven by a motor or the like. The first hinged member 22a is actuatable by a cantilever member 26 extending from the second hinged member 22b. The cantilever member 26 comprises a rigid extension of the second hinged member 22b and is adapted to contact a cantilever interface 28 provided on the first hinged member 22a. Thus, when a force is applied to actuate and/or rotate the second hinged member 22b, such force is transferred to the first hinged member 22a and both members are moved and rotated about their respective hinges. FIG. 2 depicts the hinged members 22a, 22b in a lowered and open position, wherein the pen 2 and hinged members 22a, 22b are provided in a position to receive at least the head of an animal.

In various embodiments, an aperture 29 is provided in the cantilever interface 28. A roller bearing is insertable into the aperture 29 to allow for the cantilever interface member 28 to slide smoothly along the cantilever 26 and thereby allow ease of movement of the head catch assembly, including the hinged members 22a, 22b.

In the embodiment of FIG. 2, the hinged members 22a, 22b may be raised and/or contracted to a closed state suitable for restraining the head of an animal. Specifically, hinged members 22a, 22b are adapted to be moved from an open position to a closed position wherein the closed position comprises providing the hinged members 22a, 22b proximal either sides of an animal's neck and wherein a tolerance fit is provided with the animal's head and/or withers such that the animal is substantially restrained. Second hinged member 22b may be provided in hinged communication with the frame 8 via triangular linkages, similar to the triangular linkages 24a, 24b that connect the first hinged member 22a to the frame 8.

Figure 3:
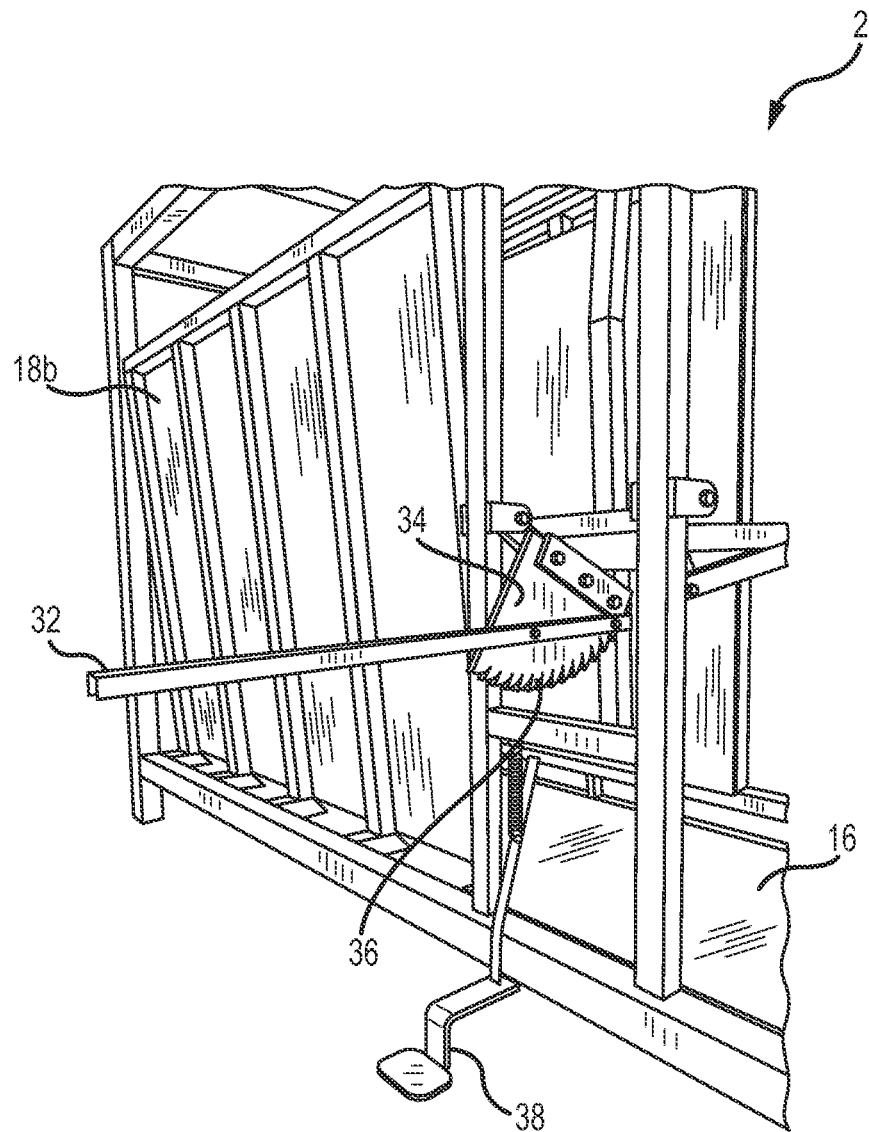
FIG. 3 is a detailed view of a component of a knocking pen according to one embodiment of the present invention.

FIG. 3 provides a detailed perspective view of a user interface associated with second hinged member 22b for applying a lifting and/or closing force to the system 2. In the embodiment of FIG. 3, the user interface comprises a lever arm 32. In alternative embodiments, however, the user interface comprises any one or more of a number of components and features suitable for lifting the second hinged member 22b, including digital or graphical user interfaces suitable for controlling a motor to actuate the second hinged member 22b. It is contemplated that the weight of the second hinged member 22b and/or the combined weight of the hinged members 22a, 22b is significant. Accordingly, the lever arm 32 is interconnected to a ratchet 34 and pawl 36 for securing the position of the second hinged member 22b at various rotational and vertical positions. When the hinged members 22a, 22b are provided at a closed position, it is contemplated that an animal to be treated or knocked is secured, and the position of the animal generally fixed. Accordingly, the animal provided in the pen is prepared for various operations, including slaughter.

As shown in FIG. 3, a position of the lever arm 32 and, thus, of the second hinged member 22b is secured by the interaction of the ratchet 34 with the pawl 36 to facilitate closing of the head restraint 20. The second hinged member 22b is lowered or opened by a release member 38, which is depicted as a foot pedal in the embodiment of FIG. 3. Thus, in order to return the second hinged member 22b to an open or lowered position, the release member 38 may be activated and the lever arm 32 positioned appropriately.

Various embodiments of the present invention contemplate the provision and incorporation of additional components adapted for knocking animals, including but not limited to stunners or bolt guns.

Figure 4:
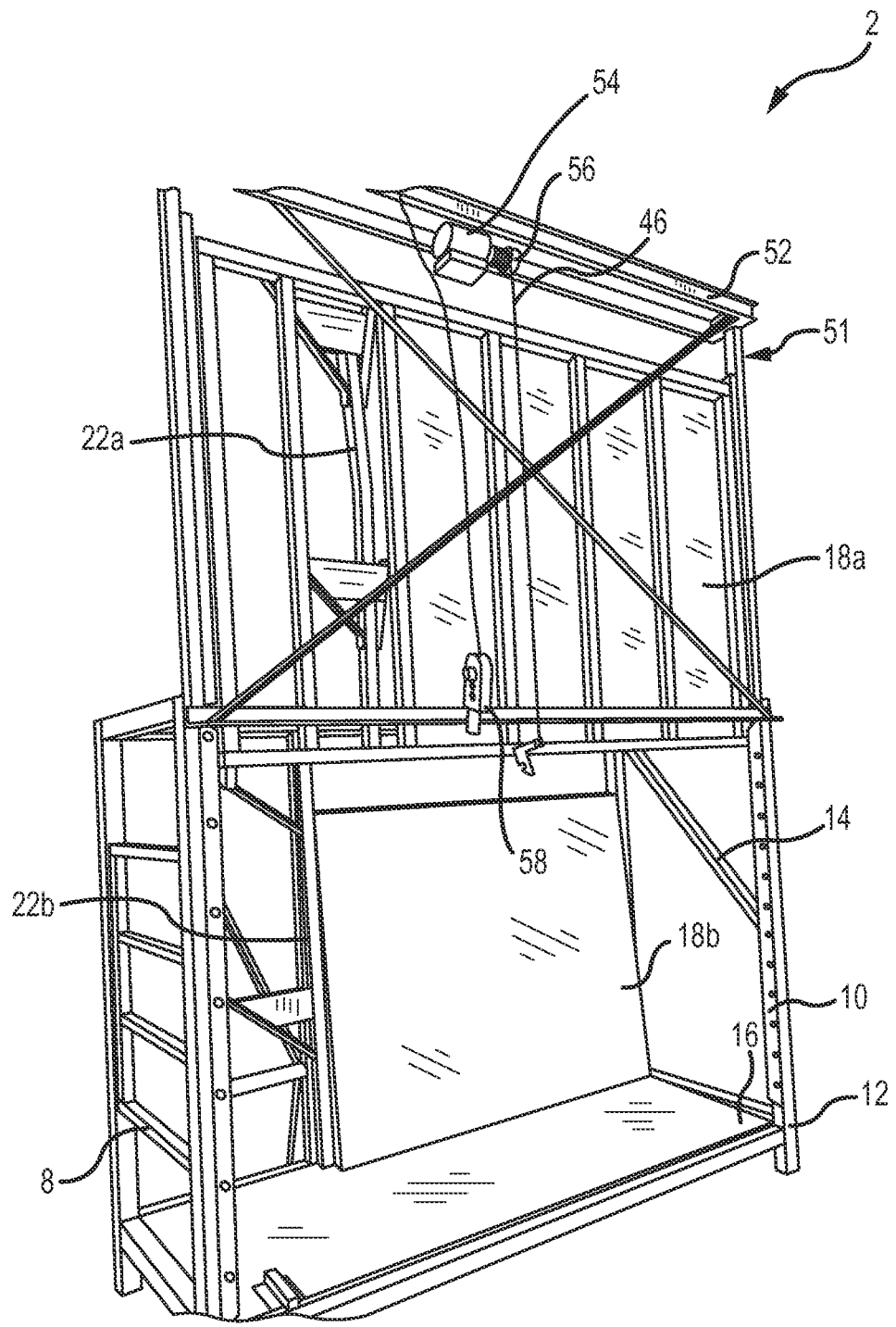
FIG. 4 is a perspective view of a knocking pen according to one embodiment of the present invention.

FIG. 4 is a perspective view of a knocking pen 2 according to one embodiment of the present invention and wherein a first sidewall 18a is translatable to allow egress or ejection of an animal. The first sidewall 18a and associated first hinged member 22b are translatable in a vertical direction between the closed position of FIG. 2 and the open position of FIG. 4. In various embodiments, the first sidewall 18a is translatable by a motor in communication with a cable and/or winch, such that simple operation of a push-button or similar feature is capable of raising the sidewall 18a. It will be recognized that an animal will typically be knocked while the pen 2 and hinged members 22a, 22b are in a closed position. Subsequently, to release the animal and open a sidewall 18a, the sidewall will be raised from the closed position. When the sidewall 18a is raised, the hinged member 22a is raised along with the sidewall, and the cantilever interface 28 is lifted off of the cantilever member 26. The sidewall 18a and hinged member 22a are thus raised collectively to the position shown in FIG. 4 and such that an animal or carcass may be easily removed from the pen 2. The vertical movement of the sidewall 18a and associated components reduces the size of the footprint required for the pen 2, especially when compared to known devices wherein gates or sidewalls are required to swing outwardly.

As shown in FIG. 4, an embodiment of the present invention comprises a pen 2 with a sidewall lifting apparatus. In the depicted embodiment, a first sidewall 18a is vertically displaceable by a motor 54 and winch 56 system disposed vertically above at least an interior volume 14 of the pen 2. For example, the motor 54 and winch 56 are provided on a track 52 or support beam upheld by at least one vertical support 51. A cable 46 extends from the winch 56 or motor 54 to a portion of the sidewall 18a, the cable 46 is adapted to transmit a force from the motor to the sidewall 18a and lift the sidewall 18a in a substantially vertical manner. A control unit 58 is provided to selectively operate the lifting features of the pen 2. The control unit 58 is depicted as a simple manual switch in FIG. 4, but one of ordinary skill in the as will recognize that any number of devices suitable for controlling the motor 54 and winch 56 are suitable for use with the present invention. The first hinged restraining member 22a is secured to the first sidewall 18a by the triangular hinge members 24a, 24b. Thus, when the sidewall 18a is displaced vertically, the first hinged restraining member is displaced along with the sidewall, and lifted off of and away from the second hinged restraining member 22b such that an animal is no longer restrained and free to exit a side of the pen 2.

In embodiments of the present invention, the first sidewall 18a is provided in a raised position, and the second sidewall 18b comprises a fixed or non-translatable wall. In alternative embodiments, more than one sidewall is translatable as shown and described herein. In a preferred embodiment, however, the second sidewall 18h comprises a fixed wall with an associated hinged member 22b comprises a powered member as shown and described herein, and the first sidewall 18a comprises a movable or translatable wall with a hinged member 22a that is actuated by the cantilever member 26 associated with the second hinged member 22b, and wherein the second hinged member 22b is capable of being lifted off the cantilever member 26 when the second sidewall 18b is to be raised.

Figure 5A:
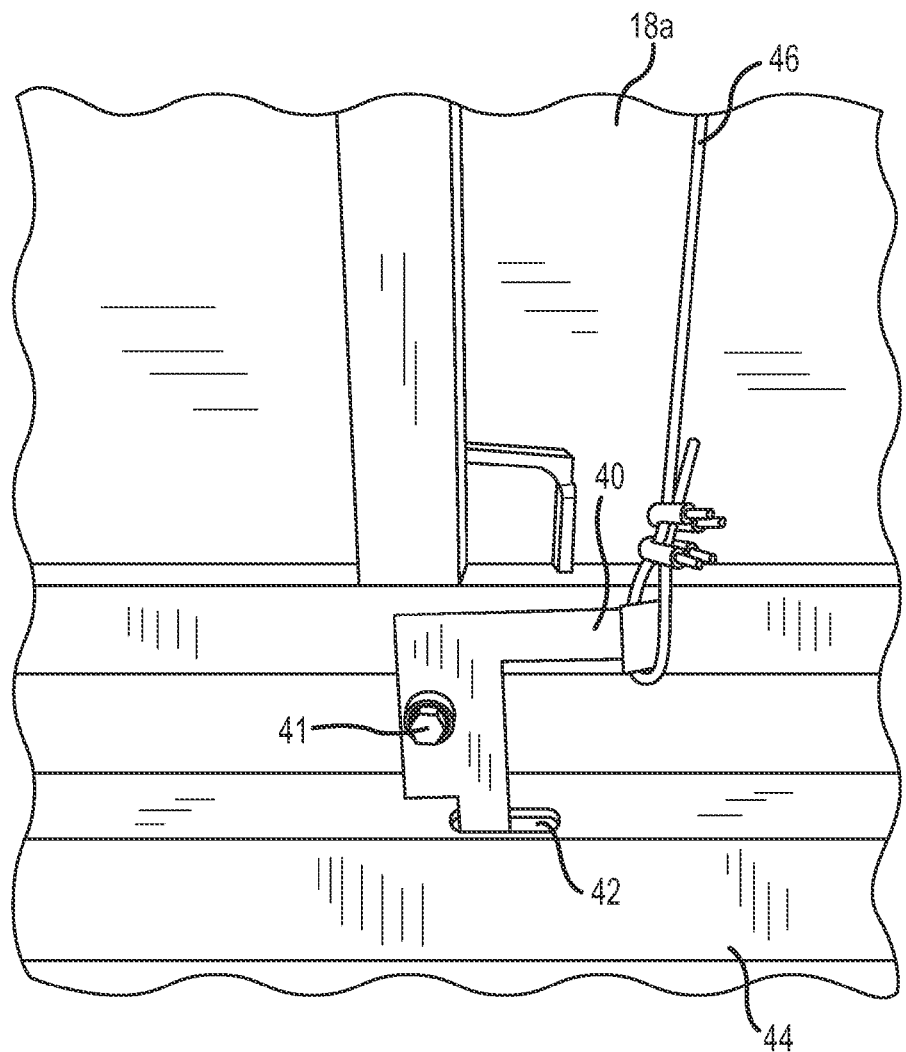
FIG. 5A is a detailed view of a component of a knocking pen according to one embodiment of the present invention.
Figure 5B:
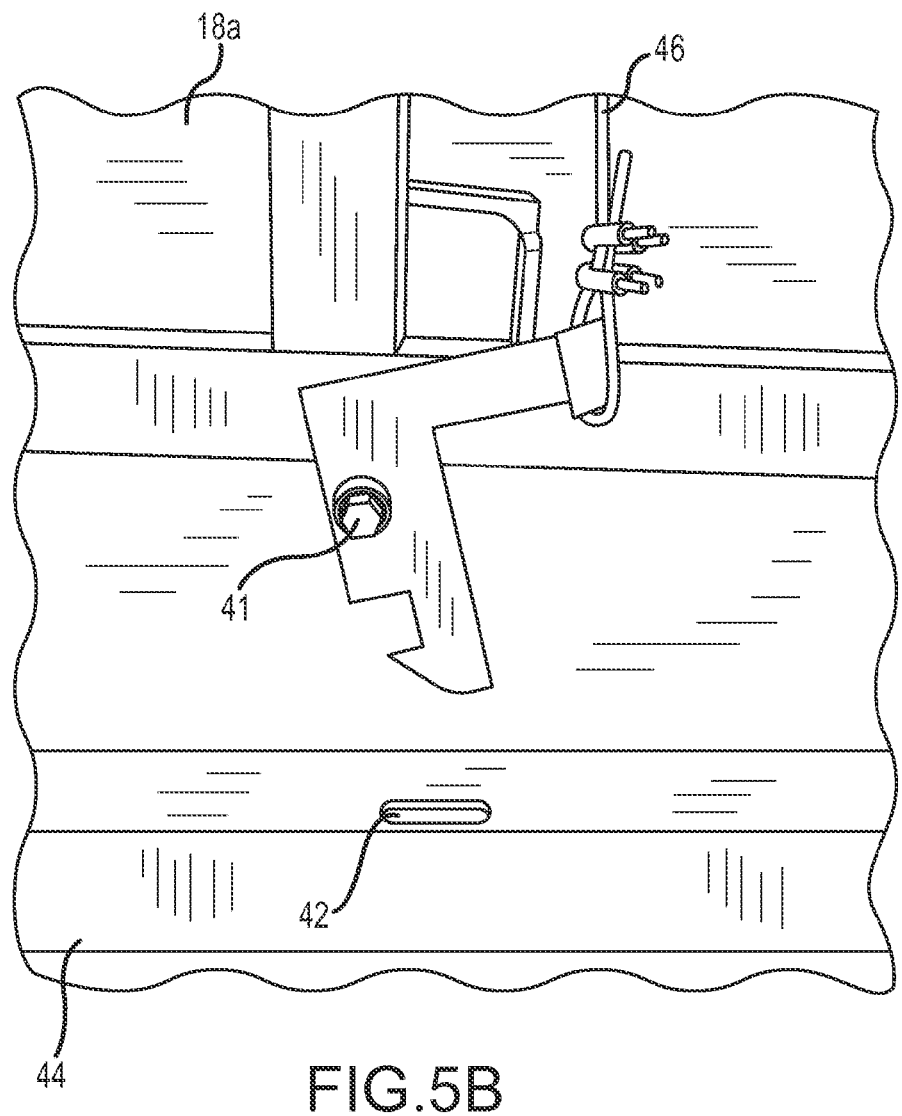
FIG. 5B is a detailed view of a component of a knocking pen according to one embodiment of the present invention.

FIGS. 5A-5B depict a pen 2 according to one embodiment of the present invention with a sidewall latch 40 provided in a closed and open position, respectively. As shown, the first sidewall 18a comprises a rotatable latch 40, the latch 40 rotatable about an axis 41, the axis 41 comprising a bolt or pin connection. The latch 40 is inserted into a slot 42 provided on a lower horizontal frame member 44 of the frame 8 as shown in FIG. 5A. In the closed position of FIG. 5A, the sidewall 18a is prevent from being opened or upwardly translated. Thus, the pen 2 is provided in a secured state to prevent unwanted opening of the sidewall 18a. FIG. 5B depicts the latch 40 in an open position, wherein a cable 46 is operable to provide a rotational force on the latch 40 and rotate the latch 40 to an open position. In the position of FIG. 5B, the latch 40 does not obstruct lifting of the first sidewall 18a. In certain embodiments, the cable 46 associated with the latch 40 is also operable to lift the sidewall 18a. In alternative embodiments, the cable 46 is provided only in association with the latch 40 for releasing the latch 40, and a separate cable is provided to lift or actuate the sidewall 18a.

Figure 6A:
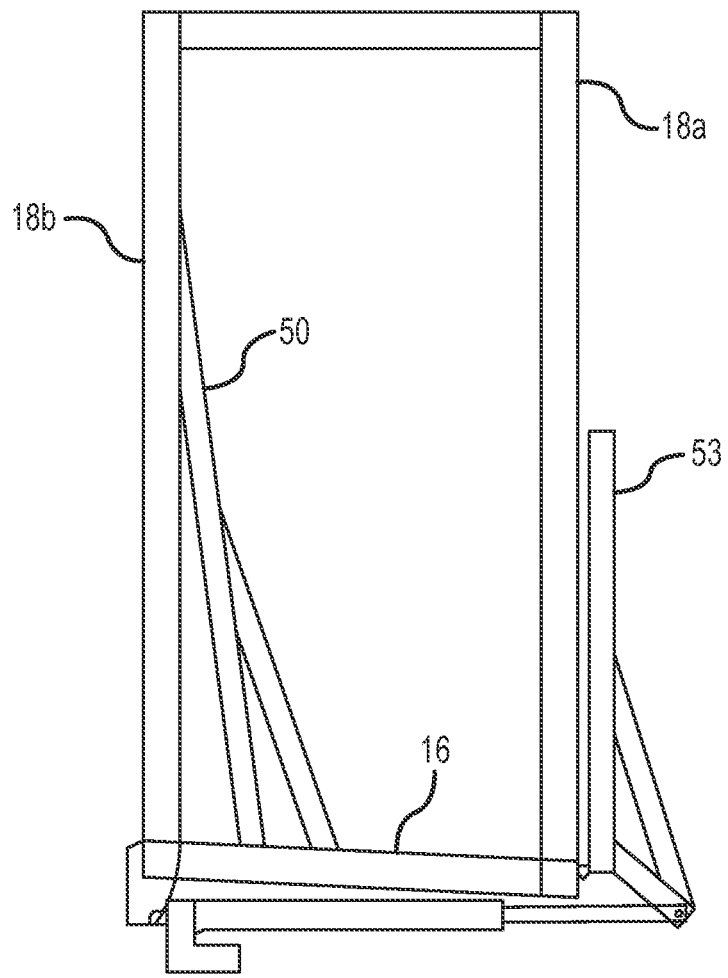
FIG. 6A is a side elevation view of a knocking pen according to one embodiment of the present invention.
Figure 6B:
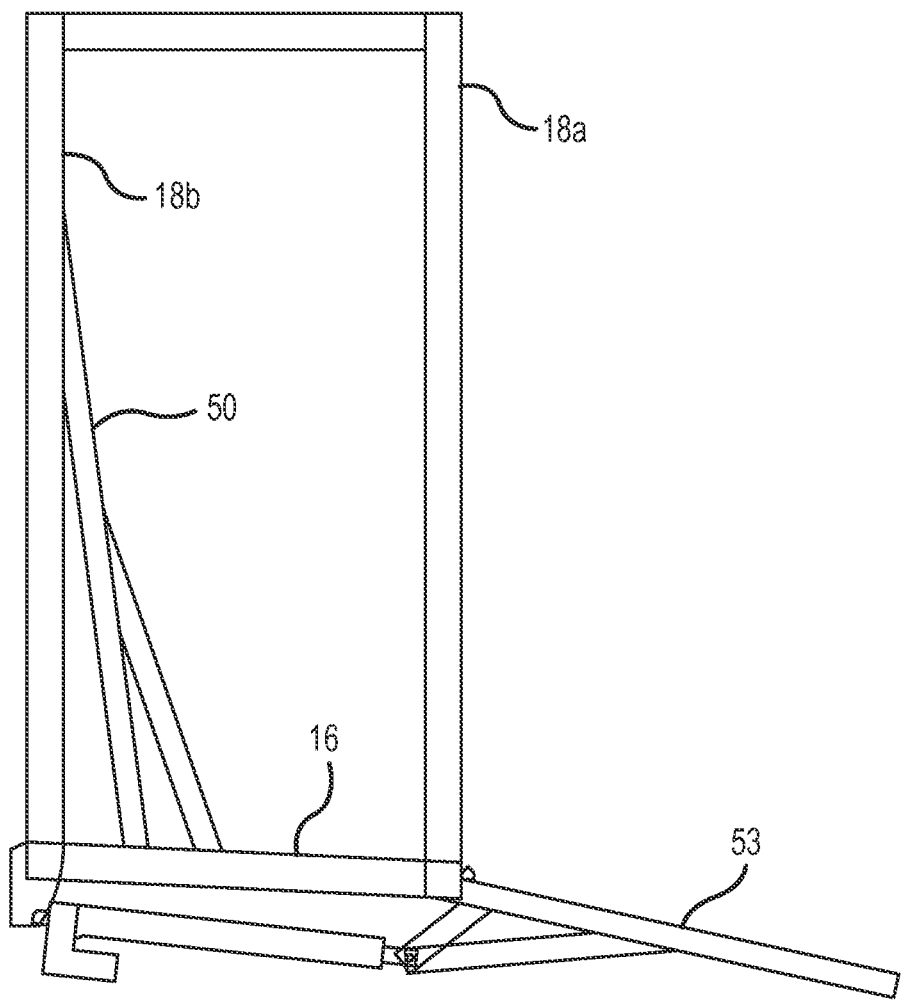
FIG. 6B is a side elevation view of a knocking pen according to one embodiment of the present invention.

In various embodiments, and as shown in FIGS. 6A-6B, the pen 2 comprises an angled wall or portion 50 that serves as an ejection feature. For example, in embodiments wherein the first sidewall 18a comprises moveable sidewall, the second sidewall 18b comprises a substantially fixed wall and comprises an angle or angled portion 50. In such embodiments, a knocked animal will fall or roll out of the pen 2 due to the force of gravity and provision of the angled portion 50. As further shown in FIGS. 6A-6B, various embodiments of the present invention comprise a pen 2 with a hinged exit door 53. FIG. 6A shows the hinged exit door 53 in a closed position, and FIG. 6B shows the door 53 in an open position to allow for ejection or release of an animal. The hinged door 52 may be provided in addition to or in lieu or movable sidewall 18a as shown and described herein.

Figure 7:
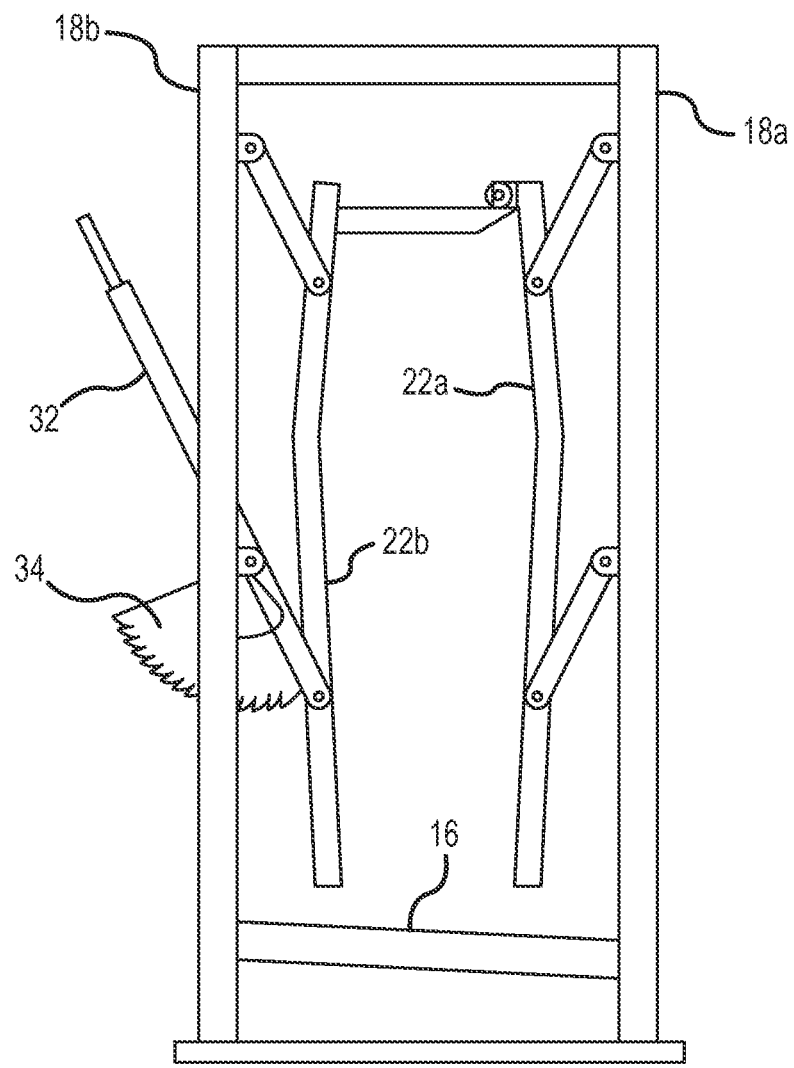
FIG. 7 is a side elevation view of a knocking pen according to one embodiment of the present invention.

FIG. 7 depicts one embodiment of a knocking pen 2 wherein a floor member 16 is provided at angle. As shown, the floor member 16 is angled toward a first side of the pen to allow for an animal, and particularly a knocked animal, to roll out of the pen. It will be recognized that certain animal to be knocked with various embodiments of the present invention may comprise large and heavy animals that are difficult to maneuver. Accordingly, embodiments of the present invention contemplate various features including but not limited to the angled floor member 16 to facilitate operations.

It is to be understood that while certain in forms of the present invention have been illustrated and described herein, it is not to be limited to the specific forms or arrangement of parts described and shown.

What is claimed is:

1. A restraining pen for humane restraining and handling of livestock animals comprising:
   a first sidewall and a second sidewall, the first sidewall and second sidewall spaced apart and at least partially defining an interior volume adapted to receive at least one of a plurality of animals;
   a first hinged restraining member, interconnected to the first sidewall, the first hinged restraining member hinged about a longitudinal axis of the pen and moveable between at least a first position and a second position;
   a second hinged restraining member, interconnected to the second sidewall, the second hinged restraining member hinged about a longitudinal axis of the pen and moveable between at least a first position and a second position;
   wherein at least one of the first hinged restraining member and the second hinged restraining member comprises a user interface for moving the hinged restraining member between the first position and the second position; and
   wherein at least one of the first sidewall and second sidewall is moveable in a vertical direction such that the sidewall and associated hinged restraining member are displaceable in a manner that allows for egress of an animal.

2. The restraining pen of claim 1, wherein at least one of the first sidewall and the second sidewall is substantially vertical.

3. The restraining pen of claim 1, wherein the first hinged restraining member comprises said user interface, and wherein the first hinged restraining member comprises a cantilevered member for transmitting a force to said second hinged restraining member.

4. The restraining pen of claim 1, further comprising a substantially planar floor member within the interior volume.

5. The restraining pen of claim 4, wherein the floor member comprises at least one of a diamond plate floor and a grate structure.

6. The restraining pen of claim 4, wherein the floor member is sloped toward at least one side or end of the restraining pen.

7. The restraining pen of claim 1, wherein the first sidewall is moveable in a vertical direction and comprises a sidewall latch, the sidewall latch being rotatable about an axis between an open position and a closed position, the axis comprising a bolt or pin,
   wherein the sidewall latch, when in the closed position, is received by a slot and prevents the first sidewall from being opened or upwardly translated.

8. The restraining pen of claim 1, wherein the first sidewall is moveable in a vertical direction, further comprising a sidewall lifting apparatus, the sidewall lifting apparatus comprising a cable, a motor, a winch, and a control unit,
   wherein the cable has a first end and a second end and is interconnected to the first sidewall at the first end and to either the motor or the winch at the second end,
   wherein the control unit enables an operator to select between an open mode and a closed mode of the sidewall lifting apparatus, and
   wherein, when the operator selects the open mode, the motor and winch transmit a lifting force to the first sidewall via the cable.

9. The restraining pen of claim 1, wherein the user interface comprises:
   a lever arm, interconnected to a ratchet and a pawl; and
   a release member.

10. The restraining pen of claim 1, further comprising a knocking component.

11. A method of humanely restraining and handling a livestock animal, comprising:
    providing a restraining pen comprising:
        a first sidewall and a second sidewall, the first sidewall and second sidewall spaced apart and at least partially defining an interior volume adapted to receive the livestock animal;
        a first hinged restraining member, interconnected to the first sidewall, the first hinged restraining member hinged about a longitudinal axis of the pen and moveable between at least an open position and a closed position;
        a second hinged restraining member, interconnected to the second sidewall, the second hinged restraining member hinged about a longitudinal axis of the pen and moveable between at least an open position and a closed position;
        wherein at least one of the first hinged restraining member and the second hinged restraining member comprises a user interface for moving the hinged restraining member between the open position and the closed position; and
        wherein the first sidewall is moveable in a vertical direction such that the first sidewall and first hinged restraining member are displaceable in a manner that allows for egress of an animal;
    moving the first hinged restraining member and the second hinged restraining member into the open position;
    placing the livestock animal substantially within the interior volume;
    moving the first hinged restraining member and the second hinged restraining member into the closed position to restrain a head of the livestock animal;

performing an operation on the livestock animal, wherein the operation comprises at least one of branding, castration, horn removal, inoculation, and slaughter;

displacing the first sidewall; and removing the livestock animal from the interior volume.

12. The method of claim 11, wherein the user interface comprises:

a lever arm, interconnected to a ratchet and a pawl; and a release member, wherein an operator moves at least one of the first hinged restraining member and the second hinged restraining member into the open position by activating the release member, moving the lever arm into a lever arm position corresponding to the open position, and deactivating the release member.

13. The method of claim 11, wherein the user interface comprises:

a lever arm, interconnected to a ratchet and a pawl; and a release member, wherein an operator moves at least one of the first hinged restraining member and the second hinged restraining member into the closed position by activating the release member, moving the lever arm into a lever arm position corresponding to the closed position, and deactivating the release member.

14. The method of claim 11, wherein an operator displaces the first sidewall by selecting an open mode of a control unit, the control unit commanding at least one of a motor and a winch to transmit a lifting force to the first sidewall via a cable when the operator selects the open mode.

15. The method of claim 11, wherein the operation is slaughter and the livestock animal is removed from the interior volume by falling or rolling out of the restraining pen under its own weight.

16. The method of claim 11, wherein the operation is slaughter and the livestock animal is removed from the interior volume by being ejected by an ejection feature, the ejection feature comprising an angled wall or portion.

17. The method of claim 11, wherein the operation is slaughter and the restraining pen further comprises a knocking component.

18. A restraining pen for humane restraining and handling of livestock animals comprising:

a first sidewall and a second sidewall, the first sidewall and second sidewall spaced apart and at least partially defining an interior volume adapted to receive at least one of a plurality of animals;

at least one hinged restraining member, interconnected to the first sidewall, the at least one hinged restraining member hinged about a longitudinal axis of the pen and moveable between at least a first position and a second position;

wherein the at least one hinged restraining member comprises a user interface for moving the at least one hinged restraining member between the first position and the second position; and wherein the first sidewall is moveable in a vertical direction such that the first sidewall and the at least one hinged restraining member are displaceable in a manner that allows for egress of an animal.

19. The restraining pen of claim 18, wherein the at least one hinged restraining member comprises a first hinged restraining member and a second hinged restraining member, the first hinged restraining member comprising the user interface, the first hinged restraining member and the second hinged restraining member being interconnected such that moving the first restraining member into either the first position or the second position forces the second hinged restraining member into the same position.

* * * * *